United States Patent
Kawata et al.

(10) Patent No.: US 8,592,100 B2
(45) Date of Patent: Nov. 26, 2013

(54) CATALYST LAYER FOR FUEL CELLS AND FUEL CELL USING THE SAME

(75) Inventors: Katsura Kawata, Gunma (JP); Takashi Yasuo, Hyogo (JP); Takahiro Isono, Hyogo (JP); Yuko Nowatari, Hyogo (JP)

(73) Assignee: Sanyo Electric Co., Ltd., Osaka (JP)

( * ) Notice: Subject to any disclaimer, the term of this patent is extended or adjusted under 35 U.S.C. 154(b) by 1267 days.

(21) Appl. No.: 12/071,916

(22) Filed: Feb. 27, 2008

(65) Prior Publication Data

US 2008/0220314 A1    Sep. 11, 2008

(30) Foreign Application Priority Data

Feb. 27, 2007  (JP) ................................. 2007-047983
Jan. 18, 2008  (JP) ................................. 2008-009409

(51) Int. Cl.
*H01M 8/10* (2006.01)
*H01M 4/86* (2006.01)
*H01M 4/90* (2006.01)

(52) U.S. Cl.
USPC ........................... 429/530; 429/479; 429/484

(58) Field of Classification Search
USPC .................. 429/479–496, 523–531; 502/300, 502/325–326
See application file for complete search history.

(56) References Cited

U.S. PATENT DOCUMENTS

| | | | |
|---|---|---|---|
| 6,255,424 B1 * | 7/2001 | Knauss | 526/347 |
| 7,662,505 B2 | 2/2010 | Suzuki | |
| 2002/0068213 A1 * | 6/2002 | Kaiser et al. | 429/40 |
| 2003/0118890 A1 * | 6/2003 | Wittpahl et al. | 429/44 |
| 2004/0058227 A1 * | 3/2004 | Tanaka et al. | 429/44 |
| 2005/0014060 A1 * | 1/2005 | Suzuki | 429/41 |
| 2005/0147861 A1 * | 7/2005 | Sonai et al. | 429/33 |
| 2006/0008678 A1 * | 1/2006 | Fukushima et al. | 428/704 |
| 2007/0092779 A1 * | 4/2007 | Jung et al. | 429/33 |
| 2007/0212591 A1 * | 9/2007 | Miyazaki et al. | 429/40 |

FOREIGN PATENT DOCUMENTS

| | | |
|---|---|---|
| CN | 1708869 A | 12/2005 |
| JP | 5-36418 | 2/1993 |

OTHER PUBLICATIONS

Chinese Office Action, w/ English translation thereof, issued in Chinese Patent Application No. CN 200810081360.3 dated Aug. 24, 2011.

Chinese Office Action, and English translation thereof, issued in Chinese Patent Application No. 200810081360.3 dated Jun. 13, 2012.

* cited by examiner

*Primary Examiner* — Jonathan Crepeau
*Assistant Examiner* — Jacob Buchanan
(74) *Attorney, Agent, or Firm* — McDermott Will & Emery LLP

(57) ABSTRACT

Provided is a fuel cell having improved ion conductivity in the catalyst layer. The catalyst layer includes a catalytic metal, a carbon particle, and an ion exchanger. The catalytic metal is carried on the carbon particle. The ion exchanger includes a first functional group capable of being adsorbed or bound to the catalytic metal, and a second functional group providing the ion conductivity. The ion exchanger is adsorbed or bound to the catalytic metal via the first functional group. The bond between the catalytic metal and the ion exchanger includes a covalent bond, a coordinate bond or an ion bond.

7 Claims, 12 Drawing Sheets

26

26

26

CATALYST LAYER FOR FUEL CELLS AND FUEL CELL USING THE SAME

CROSS-REFERENCE TO RELATED APPLICATIONS

This application is based upon and claims the benefit of priority from the prior Japanese Patent Applications No. 2007-047983, filed Feb. 27, 2007, and Japanese Patent Application No. 2008-009409, filed Jan. 18, 2008, the entire contents of which are incorporated herein by reference.

BACKGROUND OF THE INVENTION

1. Field of the Invention

The present invention relates to a fuel cell, and more specifically, to a catalyst layer used for a membrane electrode assembly provided in a fuel cell.

2. Description of the Related Art

Recently, fuel cells which achieve high efficiency in energy conversion and do not produce harmful substances by the power generation reaction, attract attentions. As one type of such fuel cells, the polymer electrolyte fuel cells (PEFC), which operate at a temperature below 100° C., are known.

The PEFC is a power generating apparatus having a basic structure in which a polymer membrane, an electrolyte membrane, is interposed between an anode and a cathode, and a fuel gas including hydrogen is fed to the anode and an oxidant gas including air to the cathode, thereby generating power according to the following electrochemical reactions.

Anode: $H_2 \rightarrow 2H^+ + 2e^-$ (1) 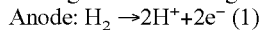
Cathode: $\frac{1}{2} O_2 + 2H^+ + 2e^- \rightarrow H_2O$ (2) 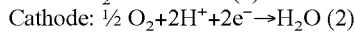

The anode and the cathode are respectively composed of structures in which a catalyst layer and a gas diffusion layer are laminated. A fuel cell is structured by opposing catalyst layers of each electrode to each other, with a polymer membrane being interposed between the catalyst layers. The catalyst layer is produced by binding carbon particles which carry catalyst with an ion exchange resin. The gas diffusion layer is a passage channel for an oxidant gas and a fuel gas.

In the anode, hydrogen contained in the fed fuel is resolved into hydrogen ions and electrons as represented in Formula (1). Of the two, the hydrogen ion moves toward the cathode within the polymer electrolyte membrane, while the electron towards the cathode through an external channel. On the other hand, in the cathode, oxygen contained in an oxidant gas fed to the cathode reacts with the hydrogen ion moving from the anode to produce water as represented in Formula (2). As the electron moves from the anode to the cathode within the external channel in this way, power can be taken out from the external channel.

SUMMARY OF THE INVENTION

A conventional catalyst layer is generally a mixture type in which an ion exchanger such as NAFION (manufactured by Du Pont Inc., registered trade mark), a sulfonated tetrafluoroethylene based fluoropolymer-copolymer, is mixed into a catalyst carried on carbon. However, the catalyst layer (NAFION mixture type) used in a conventional fuel cell has low efficiency in utilizing the catalytic metal. This is because the three-phase interface is not efficiently formed among the fuel gas, the catalytic metal and the ion exchanger. More specifically, the ion exchanger such as NAFION is not mixed into the catalytic metal uniformly, therefore causing a thickness of the ion exchanger to be greater (i.e., causing a lump of the ion exchanger). These lumps impede gas diffusion and break the proton transfer path, causing the efficiency in utilizing the catalytic metal to lower.

In view of these circumstances, the present invention has been made and a general purpose of the invention is to provide a technique in which the fuel gas diffusion property and the ion conductivity can be improved.

One embodiment of the present invention is a catalyst layer for fuel cells. The catalyst layer for fuel cells includes a catalytic metal; and an ion exchanger which has a first functional group capable of being adsorbed or bound to the catalytic metal, and a second functional group providing the ion conductivity, wherein the first functional group is adsorbed or bound to the catalytic metal.

According to the catalyst layer for fuel cells of the above embodiment, since the adherence between the catalytic metal and the ion exchanger is enhanced such that the ion exchanger adheres to the catalytic metal uniformly, the gas diffusion property and the ion conductivity are improved.

In the catalyst layer for fuel cells of the above embodiment, the bond between the first functional group and the catalytic metal may be a chemical bond or a bond by the electrostatic interaction. The above chemical bond includes a covalent bond, a coordinate bond and an ion bond, etc.

In the catalyst layer for fuel cells of the above embodiment, the first functional group may be selected from a group consisting of functional groups including at least one of sulfur, oxygen, nitrogen, phosphorus, carbon, boron and a halogen atom.

In the catalyst layer for fuel cells of the above embodiment, the ion exchanger may be a linear polymer. According to the embodiment, since the proton transfer path originating from the catalytic metal extends further, the ion conductivity of the catalyst layer for fuel cells can be improved further.

In the catalyst layer for fuel cells of the above embodiment, the ion exchanger may be a dendron. According to the embodiment, since the ion exchanger forms a dendritic structure, the proton transfer path extends three-dimensionally. As a result, since there are more portions where the adjacent ion exchangers contact with each other, the proton conductivity can be improved further. In this case, the catalyst layer for fuel cells may further include a carbon material which carries the catalytic metal, and the second functional group may be in contact with the catalytic metal or the carbon material. Or, the second functional group may be a sulfonic acid group, a phosphate group or a combination thereof.

Another embodiment of the present invention is a fuel cell. The fuel cell includes an electrolyte membrane; a cathode in contact with the surface of one side of the electrolyte membrane; and an anode in contact with the surface of the other side of the electrolyte membrane, wherein the cathode and/or the anode include a catalyst layer of any one of the aforementioned embodiments.

In the fuel cell of the above embodiment, different types of catalyst layers may be laminated one on another.

DETAILED DESCRIPTION OF THE INVENTION

The invention will now be described by reference to the preferred embodiments. This does not intend to limit the scope of the present invention, but to exemplify the invention.
(First Embodiment)

Figure 1:
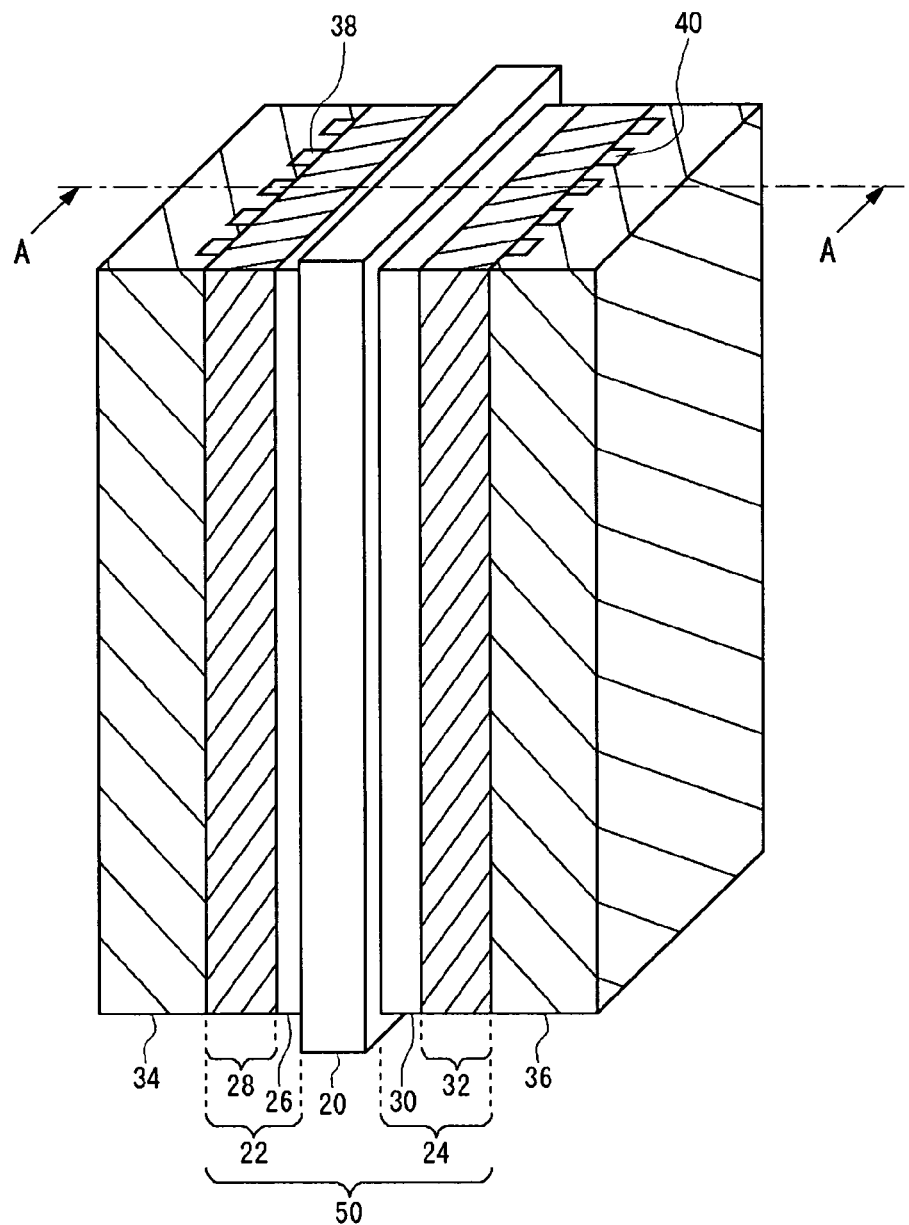
FIG. 1 is a perspective view showing schematically a structure of the fuel cell in accordance with the first embodiment.
Figure 2:
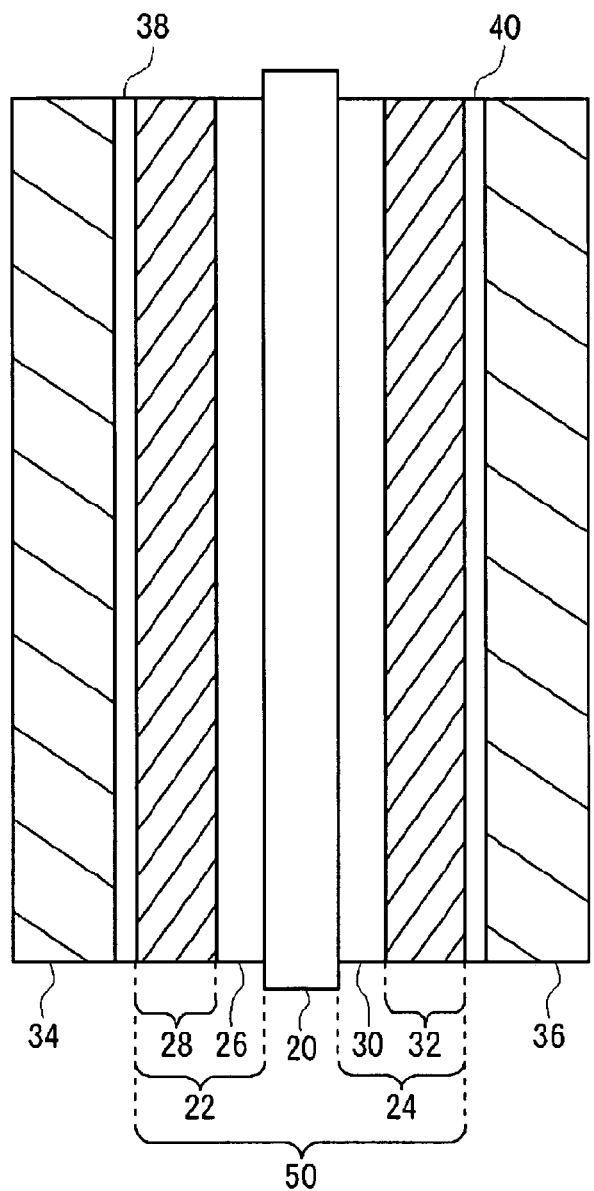
FIG. 2 is a cross-sectional view taken along the line A-A in FIG. 1.

FIG. 1 is a perspective view showing schematically a structure of the electrode catalyst and the fuel cell 10 using the same in accordance with the first embodiment. FIG. 2 is a cross-sectional view taken along the line A-A in FIG. 1. The fuel cell 10 includes a flat plate-shaped cell 50 and separators 34 and 36 are provided on both sides of the cell 50. In this embodiment, only one cell 50 is illustrated as an example; however, the fuel cell 10 may be structured by a plurality of cells 50 being laminated via the separators 34 and 36. The cell 50 includes a polymer electrolyte membrane 20, an anode 22, and a cathode 24. The anode 22 includes a lamination body composed of a catalyst layer 26 and a gas diffusion layer 28. Similarly, the cathode 24 includes a lamination body composed of a catalyst layer 30 and a gas diffusion layer 32. The catalyst layer 26 of the anode 22 and the catalyst layer 30 of the cathode 24 are provided so as to oppose to each other, with the polymer electrolyte membrane 20 being interposed therebetween.

A gas channel 38 is provided in the separator 34 provided on the side of the anode 22. A fuel gas is distributed from a manifold for feeding fuel (not shown) into the gas channel 38 to be fed to the cell 50 via the gas channel 38. Similarly, a gas channel 40 is provided in the separator 36 provided on the side of the cathode 24. An oxidant gas is distributed from a manifold for feeding oxidant (not shown) into the gas channel 40 to be fed to the cell 50 via the gas channel 40. Specifically, during operation of the fuel cell 10, a fuel gas, for example hydrogen gas, is fed to the anode 22 by flowing the fuel gas within the gas channel 38 from top to bottom along the surface of the gas diffusion layer 28. On the other hand, during operation of the fuel cell 10, an oxidant gas, for example air, is fed to the cathode 24 by flowing the oxidant gas within the gas channel 40 from top to bottom along the surface of the gas diffusion layer 32. With this, a reaction occurs in the cell 50. When hydrogen gas is fed to the catalyst layer 26 via the gas diffusion layer 28, the hydrogen in the gas becomes proton and the proton moves toward the cathode 24 within the polymer electrolyte membrane 20. The electron released at the time moves into the external channel to flow into the cathode 24. On the other hand, when air is fed to the catalyst layer 30 via the gas diffusion layer 32, water is produced by the oxygen being bound to the proton. As a result, the electron flows from the anode 22 to the cathode 24 in the external channel, enabling the power to be taken out.

The polymer electrolyte membrane 20 exhibits a good ion conductivity in a wet state and serves as an ion exchange membrane for transferring proton between the anode 22 and the cathode 24. The polymer electrolyte membrane 20 is made from a polymer such as a fluorine-containing polymer and a non-fluorine polymer. For example, a sulfonic acid type perfluorocarbon polymer, a polysulfone resin, a perfluorocarbon polymer with a phosphonic acid group or a carboxylic acid group, are available. As an example of a sulfonic acid type perfluorocarbon polymer, NAFION (manufactured by Du Pont Inc., registered trade mark) 112, a sulfonated tetrafluoroethylene based fluoropolymer-copolymer, etc. can be cited. As an example of a non-fluorine polymer, a sulfonated aromatic polyetheretherketone and a polysulphone, etc. can be cited.

Figure 3:
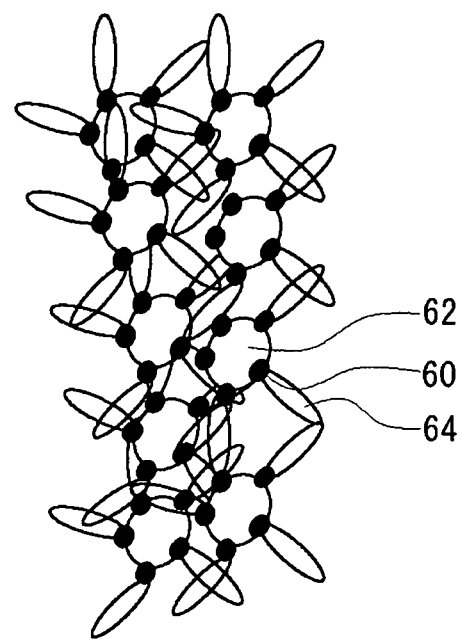
FIG. 3 is a conceptual view showing a structure of the catalyst layer forming the anode in accordance with the first embodiment.

FIG. 3 is a conceptual view showing a structure of the catalyst layer 26 forming the anode 22. As shown in FIG. 3, the catalyst layer 26 includes a catalytic metal 60, a carbon particle 62, and an ion exchanger 64. The catalytic metal 60 is carried on the carbon particle 62. The ion exchanger 64 is adsorbed or bound to the catalytic metal 60 via a functional group which is described later, capable of being adsorbed or bound to the catalytic metal 60. The bond between the catalytic metal 60 and the ion exchanger 64 includes a chemical bond or a bond by the electrostatic interaction. The chemical bond includes a covalent bond, a coordinate bond and an ion bond, etc.

The catalytic metal 60 carried on the carbon particle 62 includes, for example, an alloy or a simple substance selected from a group of Sc, Y, Ti, Zr, V, Nb, Fe, Co, Ni, Ru, Rh, Pd, Pt, Os, Ir, elements of lanthanoid series, and elements of actinoid series. The carbon particle 62 carrying the catalytic metal 60 includes acetylene black, ketjenblack, carbon nano tube.

The ion exchanger 64 of the present embodiment is a linear polymer. The linear polymer includes an aromatic hydrocarbon and a fluorine-containing ion exchanger, etc.

A linear polymer serving as the ion exchanger 64 has a functional group capable of being adsorbed or bound to the catalytic metal. Such a functional group includes —SH, —NHR, —NH$_2$, —N$_2$H$_4$, —OH, —OR, —SO$_3$H, —CN, —PR$_3$, —P(OR)$_3$, —SR$_2$, —PO$_3^{2-}$, disulfide or the like, which are functional groups including at least one of sulfur, oxygen, nitrogen, phosphorus, carbon, boron and a halogen atom. The above R includes a hydrocarbon-based functional group, an aromatic-based functional group, an alkoxy group, an amide group, or a combination thereof.

A linear polymer serving as the ion exchanger 64 has a functional group for securing the ion conductivity. The functional groups for securing the ion conductivity include one or more of sulfonic acid groups, phosphoric acid groups or combinations thereof.

According to the catalyst layer 26 of the embodiment, since the ion exchanger 64 is linear, the transfer path from the catalytic metal extends further, the ion conductivity can be improved. In addition, since there are relatively less portions where the adjacent ion exchangers contact with each other, the gas passage channel is secured, enabling the gas diffusion property to be improved.

Referring back to the explanation of the anode 22, the gas diffusion layer 28 composing the anode 22 includes an anode gas diffusion substrate and a microporous layer coated on the anode gas diffusion substrate. The anode gas diffusion substrate is preferably composed of a porous body having the electronic conductivity. For example, the carbon paper, the woven or nonwoven carbon cloth etc., are available.

The microporous layer coated on the anode gas diffusion substrate is a paste-form mixture produced by mixing a conductive powder and a water-repellent agent. As the conductive powder, for example, the carbon black is available. As the water-repellent agent, a fluorine-containing resin such as a poly (tetrafluoroethylene) resin (PTFE) is available. The water-repellent agent has preferably a binding property. Herein, the binding property refers to a property in which materials that are less sticky or prone to crumble are bound together to be sticky. Due to the binding property of the water-repellent agent, mixing the conductive powder with the water-repellent agent can produce a paste.

A catalyst layer 30 and a gas diffusion layer 32 have the same structures as the catalyst layer 26 and the gas diffusion layer 28 which compose the anode 22, respectively. Therefore, an explanation on the catalyst layer 30 and the gas diffusion layer 32 will be omitted.

(Method of Manufacturing Catalyst Layer)

Herein, a method of manufacturing a catalyst layer used in the fuel cell in accordance with the present embodiment will be described below.

At first, a catalyst layer ink is prepared by mixing a solution of an ion exchanger made from a linear polymer having a thiol group, with a catalyst carried on carbon. The catalyst carried on carbon includes an alloy or a simple substance selected from a group of Sc, Y, Ti, Zr, V, Nb, Fe, Co, Ni, Ru, Rh, Pd, Pt, Os, Ir, elements of lanthanoid series, and elements of actinoid series.

The ion exchange solution is one in which a linear polymer is dissolved or dispersed. A solvent of the solution includes methanol, ethanol, propanol, butanol and ion-exchange water or the like. The linear polymer includes an aromatic hydrocarbon and a fluorine-containing ion exchanger or the like.

A mixing ratio of the ion exchanger, the catalyst, and the solvent is 0.5 g:5 g:9.5 g. As described above, the content of the ion exchanger in the organic solvent is 5% in the present embodiment; however, the content may be in the range of 1 to 20%. In the embodiment, the content of the ion exchanger in the catalyst ink is 3%; however, the content may be in the range of 0.5 to 15%.

Subsequently, the catalyst ink will be spray-coated on the surfaces of the electrolyte membrane, surfaces on the side of the cathode and on the side of the anode, respectively. The solvent in the catalyst ink is dried with hot air, vacuum, or less humid air. The temperature of drying air is preferably 80 to 350° C. more preferably 100 to 250° C. Finally, the whole of the catalyst layer and the electrolyte membrane is heat-pressed with a hot press (5 MPa, 150° C., 90 seconds). With the aforementioned steps, the catalyst layer in accordance with the present embodiment can be manufactured.

(Second Embodiment)

Figure 4:
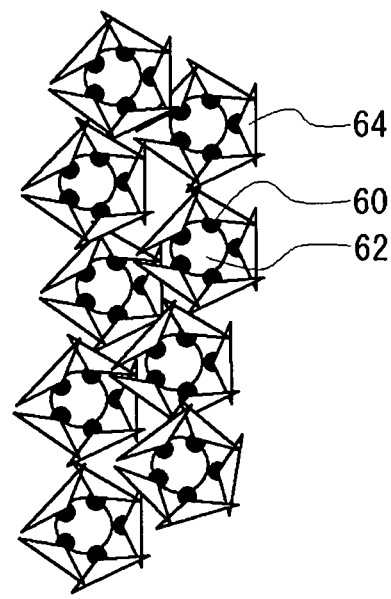
FIG. 4 is a conceptual view showing a structure of the catalyst layer included in the fuel cell in accordance with the second embodiment.

FIG. 4 is a conceptual view showing a structure of the catalyst layer included in the fuel cell in accordance with the second embodiment. In the embodiment, a dendron is used as an ion exchanger 64. The dendron has any form of dendron structures. The dendron includes a dendrimer, a dendron and a hyperbranched polymer or the like.

Figure 5:
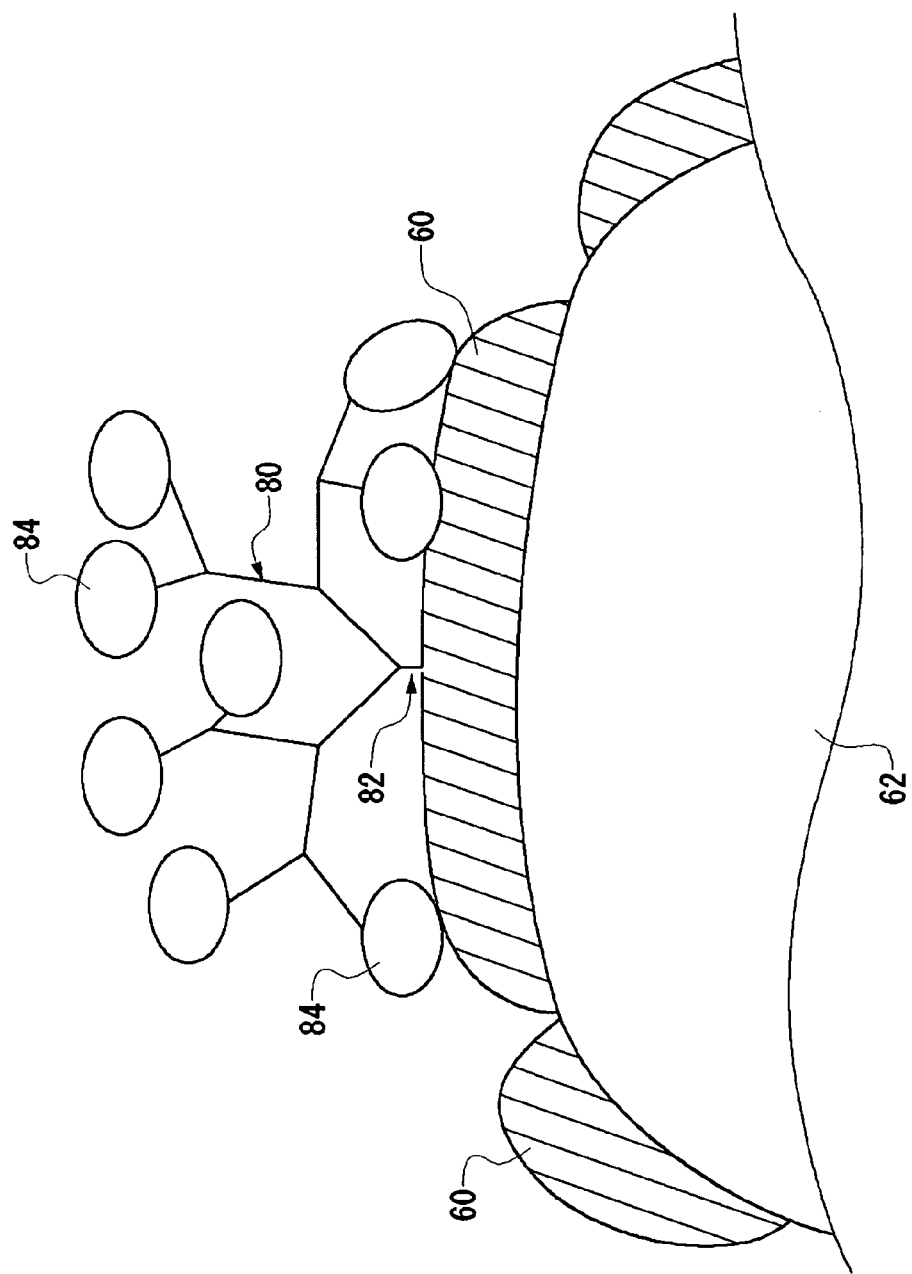
FIG. 5 is an enlarged view of a main portion, showing a structure of the catalyst layer included in the fuel cell in accordance with the second embodiment.

The dendron has a functional group capable of being adsorbed or bound to the catalytic metal 60 and a functional group for securing the ion conductivity, in the same way as with the above linear polymer. As shown in FIG. 5, the dendron 80 is adsorbed or bound to the catalytic metal 60 via a functional group 82 capable of being adsorbed or bound to the catalytic metal 60. In the present embodiment, at least one of the functional groups 84 for securing the ion conductivity is in contact with the catalytic metal 60 carried by a carbon particle 62. As shown in FIG. 5, a plurality of catalytic metals 60 may be carried by the carbon particle 62. In this case, the functional group 84 of the dendron 80 may be in contact with another catalytic metal 60 which is located nearby the catalytic metal 60 to which the functional group 82 is adsorbed or bound. FIG. 5 illustrates a structure in which the dendron is in contact with the catalytic metal; however, a dendrimer structure in which the catalytic metal is placed in the core may also be adopted.

In the present embodiment, since the ion exchanger 64 has a dendritic structure, the ion (proton) transfer path extends three-dimensionally. As a result, since there are more portions where the adjacent ion exchangers 64 contact with each other, the ion (proton) transfer path can be improved. In addition, since a functional group for securing the ion (proton) transfer path, such as a sulfonic acid group, is in contact with the catalytic metal 60, the space where a proton is produced can be enlarged. Since the ion exchanger is bound to the catalytic metal 60 uniformly and with an even thickness, the gas diffusion property is improved. Additionally, the carbon particles 62 are sufficiently close to each other in the catalyst layer 26, the electron transfer path is sufficiently secured (While FIGS. 3 to 9 are schematic views for emphasizing the ion transfer path, the electron transfer paths are actually formed three-dimensionally.)

(Method of Synthesizing Dendron Having Thiol Group)

Herein, a method of synthesizing a dendron having a thiol group, will be described. 1.62 g (2.0 mmol) of compound A of 3,5-bis[3,5-bis(benzyloxy)benzyloxy]benzyl bromide, and 0.18 g (2.4 mmol) of thiourea are mixed in a solvent (dimethylsulfoxide (DMSO) 10 ml) to be stirred at a room temperature for 12 hours. The produced mixture is added with 5 ml of sodium hydrate having a concentration of 10 wt % to be stirred at a room temperature for 1 hour. Subsequently, the mixture is adjusted such that its pH is 3, with diluted hydrochloric acid and then is extracted by acetic ether. The produced acetic ether layer is dried with magnesium sulfate such that the solvent is removed. With these steps, a dendron having a thiol group, which is represented by the following formula, can be obtained.

[Formula 1]

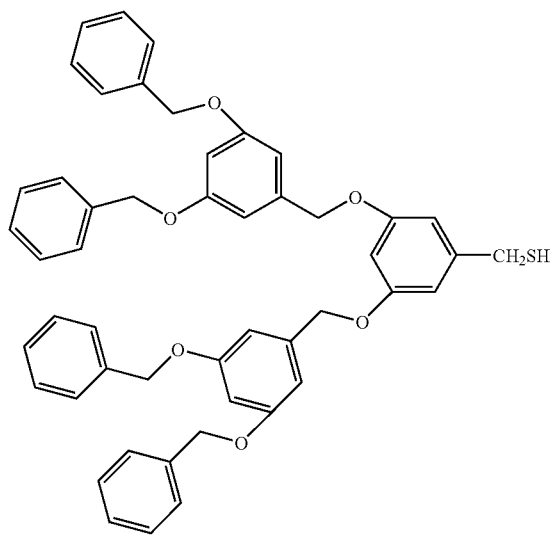

Then, a sulfuric acid aqueous solution having a concentration of 10% and the dendron having a thiol group are mixed together to be stirred at a room temperature for 10 hours. As a result, a dendron ion exchanger having a thiol group, which is represented by the following formula and the benzene ring thereof is sulfonated, can be obtained.

[Formula 2]

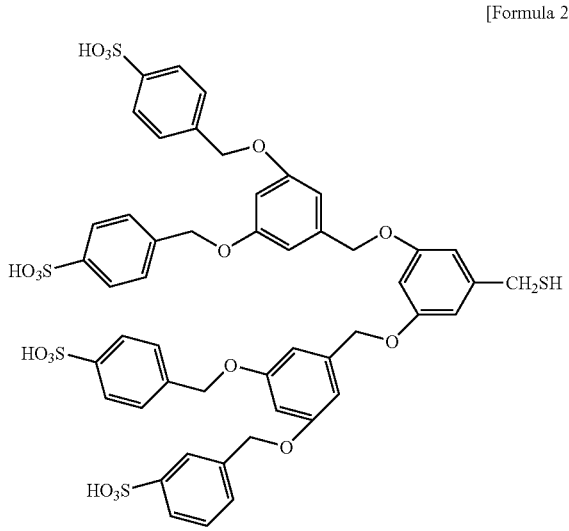

(Third Embodiment)

Figure 6:
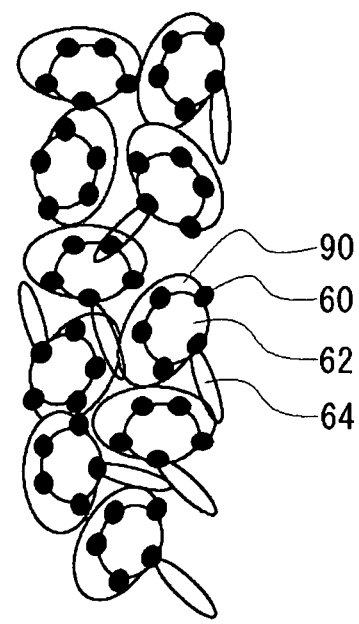
FIG. 6 is a conceptual view showing a structure of the catalyst layer included in the fuel cell in accordance with the third embodiment.

FIG. 6 is a conceptual view showing a structure of the (Third Embodiment)

FIG. 6 is a conceptual view showing a structure of the catalyst layer included in the fuel cell in accordance with the third embodiment. The catalyst layer 26 in accordance with the third embodiment further includes an electrolyte 90 such as NAFION (manufactured by Du Pont Inc., registered trade mark), a sulfonated tetrafluoroethylene based fluoropolymer-copolymer, in addition to the catalyst layer of the first embodiment. According to this structure, since a linear ion exchanger is adsorbed or bound to the catalytic metal 60 not covered by the electrolyte 90, the active catalytic metal 60 is increased, and therefore the area of the three-phase interface is increased.

(Method of Manufacturing Catalyst Layer)

At first, the platinum carried on carbon used as a catalyst carried on carbon, is mixed with the NAFION solution having a concentration of 5 wt % manufactured by SIGMA-ALDRICH Co. In general, a volume of the NAFION to be mixed is preferably smaller than that of a catalyst layer necessary when an ion exchanger is manufactured only by the NAFION. Subsequently, a solution of an ion exchanger made from a linear polymer is added by the operation of spray-coating or the like. After this step, with the same manufacturing steps as the first embodiment, the catalyst layer in accordance with the third embodiment can be obtained.

(Fourth Embodiment)

Figure 7:
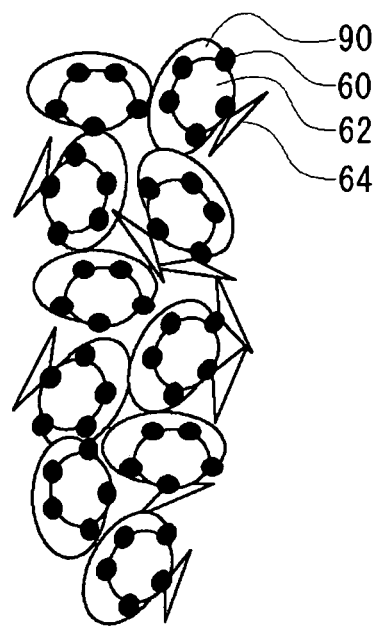
FIG. 7 is a conceptual view showing a structure of the catalyst layer included in the fuel cell in accordance with the fourth embodiment.

FIG. 7 is a conceptual view showing a structure of a catalyst layer included in the fuel cell in accordance with the fourth embodiment. The catalyst layer 26 in accordance with the fourth embodiment further includes an electrolyte 90 such as NAFION, a sulfonated tetrafluoroethylene based fluoropolymer-copolymer, in addition to the catalyst layer of the second embodiment. According to the structure, since a dendron is adsorbed or bound to the catalytic metal 60 not covered by the electrolyte 90, the active catalytic metal 60 is increased, and therefore the area of the three-phase interface is increased. In addition, since the adjacent dendrons contact with each other more frequently, the ion (proton) transfer path extends further, the ion conductivity can be improved.

(Method of manufacturing catalyst layer)

At first, a platinum catalyst carried on carbon used as a catalyst carried on carbon, is mixed NAFION solution having a concentration of 5wt % manufactured by SIGMA-ALDRICH Co. In general, a volume of the NAFION, a sulfonated tetrafluoroethylene based fluoropolymer-copolymer, to be mixed is preferably smaller than that of a catalyst layer necessary w hen an ion exchanger is manufactured only by the NAFION. Subsequently, a solution of an ion exchanger composed of a dendron, is added by the operation of spray-coating or the like. After this step, with the same manufacturing steps as the first embodiment, the catalyst layer in accordance with the fourth embodiment can be obtained.

(Fifth Embodiment)

Figure 8:
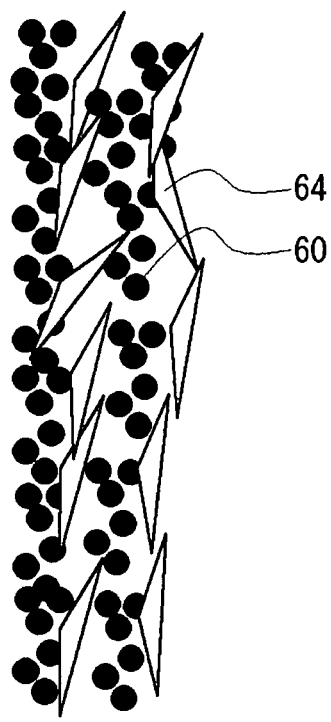
FIG. 8 is a conceptual view showing a structure of the catalyst layer included in the fuel cell in accordance with the fifth embodiment.

While the first and second embodiments show examples using a catalyst carried on carbon, the platinum black or the like which is not carried on carbon, may be used as a catalytic metal 60 as shown in FIG. 8. In the catalyst layer 26 in accordance with the fifth embodiment, the ion exchanger 64 made from a dendron is adsorbed or bound to the catalytic metal 60. In general, the platinum black can increase a volume of a catalytic metal compared to a catalyst carried on carbon. Besides that, a linear polymer may be adsorbed or bound to the catalytic metal 60.

(Method of Manufacturing Catalyst Layer)

A catalyst layer of the present embodiment can be obtained with the same steps as with the first embodiment, except for using the platinum black as a catalyst particle.

EXAMPLE 1

As Example 1, a cell, which is a specific example of the fifth embodiment, was manufactured according to the following steps.

(Preparation of Catalyst Slurry)

5 g of the platinum black, which is used as a catalyst, was added into 10 g of water to be stirred. 0.5 g of the dendron ion exchanger (see Formula 2), which is described in the second embodiment, is added with 9.5 g of DMSO (dimethylsulfoxide) to be stirred, resulting in a DMSO solution of the dendron ion exchanger. The above stirred catalyst was added with the DMSO solution of the dendron ion exchanger to produce a mixture. The mixture was then stirred sufficiently to produce a catalyst slurry.

(Manufacture of catalyst layer)

The cathode was made by spray-coating the above catalyst slurry on the aforementioned gas diffusion layer 32 in a way that a volume of the catalyst was to be 4 to 6 mg/cm2. The anode was made by screen-printing the catalyst slurry mixed the platinum catalyst carried on carbon with the NAFION, a sulfonated tetrafluoroethylene based fluoropolymer-copolymer, on the afore-mentioned gas diffusion layer 28 in a way that a volume of the catalyst was to be 0.5 mg/cm2.

(Manufacture of cell)

A cell with its electrode area of 4 cm2 was manufactured by hot-pressing a structure made of the cathode, the anode and the NAFION, a sulfonated tetrafluoroethylene based fluoropolymer-copolymer, membrane interposed therebetween, at a temperature of 150° C. and 2.1 kN for 90seconds. Assuming this cell is one in accordance with the first embodiment, the property of the single cell was evaluated by a power generating apparatus using the cell as described later.

(Sixth Embodiment)

While the catalyst layer has a single layer in the above embodiments from the first to the fifth, the catalyst layer may have multiple catalyst layers. In the sixth embodiment, the catalyst layer 26 has two catalyst layers composed of the first layer 100 and the second layer 110. The catalyst layer 30 has two layers composed of the first layer 120 and the second layer 130. Each layer may be any combination of the following catalyst structures.

Figure 9:
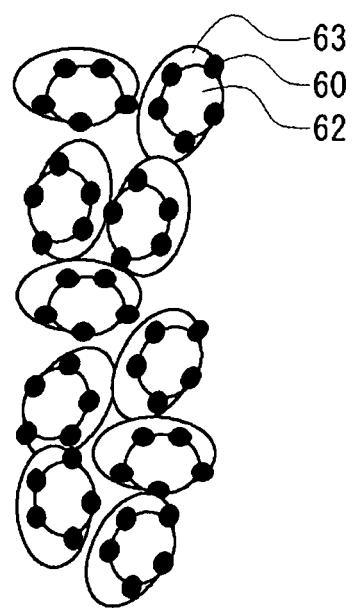
FIG. 9 is a schematic view showing the catalyst structure A.
Figure 10:
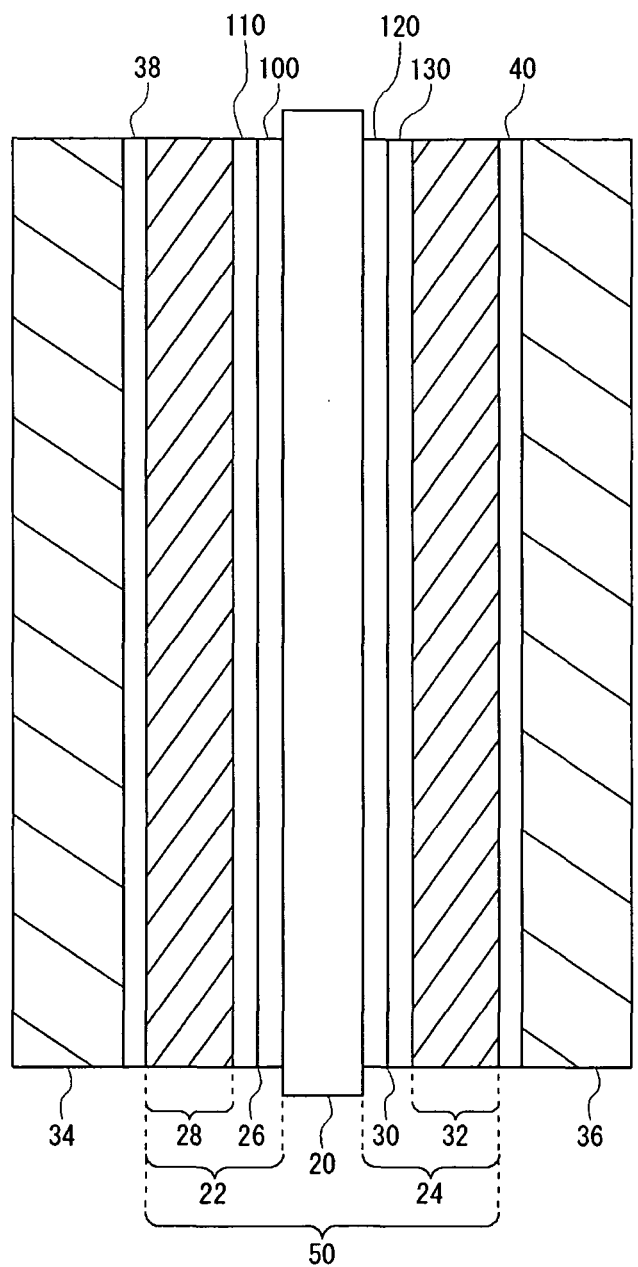
FIG. 10 is a conceptual view showing a structure of the catalyst layer included in the fuel cell in accordance with the sixth embodiment.
Figure 11:
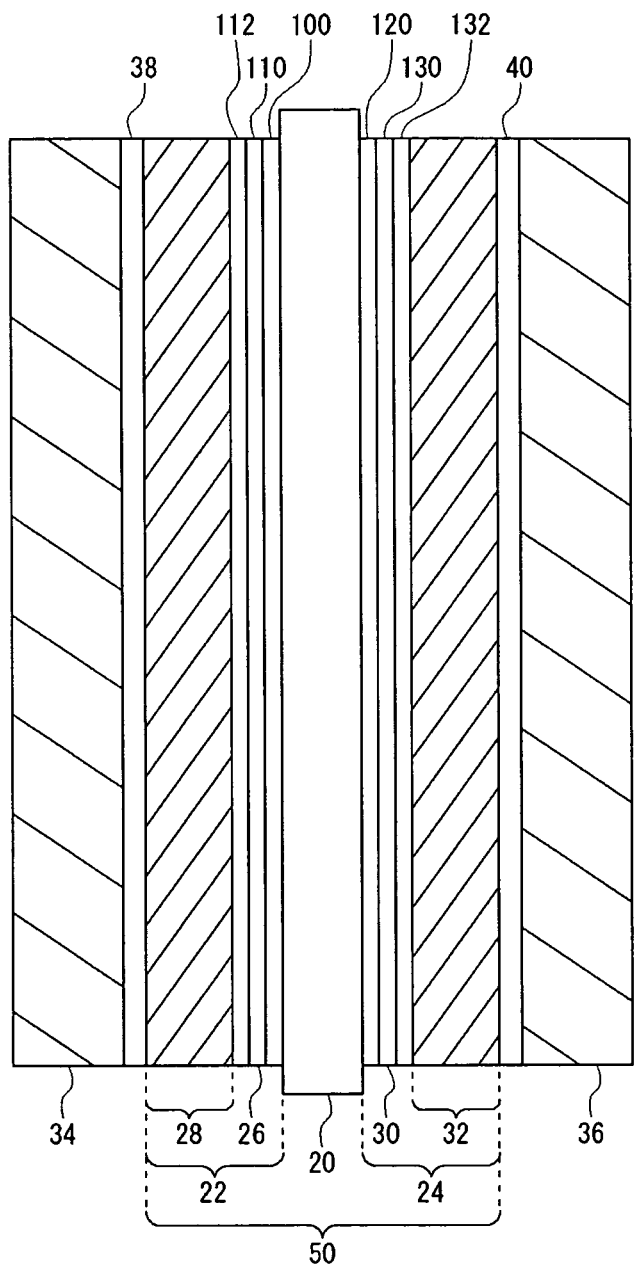
FIG. 11 is a conceptual view showing a structure of the catalyst layer included in the fuel cell in accordance with the seventh embodiment.

(1) Catalyst structure A made by mixing NAFION, a sulfonated tetrafluoroethylene based fluoropolymer-copolymer, with the platinum carried on carbon well known: Specifically, the catalyst structure A has a structure in which the catalytic metals 60 made of platinum is carried on the carbon particles 62 and the NAFION 63 covers around the catalytic metals 60 and the carbon particles 62, as shown in FIG. 9.

(2) Catalyst structure B made by an ion exchanger made from a linear polymer, being adsorbed or bound to the platinum carried on carbon, as shown in the first embodiment.

Typical catalyst arrangements having two catalyst layers are listed in Table 1.

TABLE 1

| | CATALYST STRUCTURE OF FIRST LAYER | CATALYST STRUCTURE OF SECOND LAYER |
|---|---|---|
| EXAMPLE 1 OF CATALYST ARRANGEMENT | A | B |
| EXAMPLE 2 OF CATALYST ARRANGEMENT | A | C |
| EXAMPLE 3 OF CATALYST ARRANGEMENT | A | D |
| EXAMPLE 4 OF CATALYST ARRANGEMENT | A | E |
| EXAMPLE 5 OF CATALYST ARRANGEMENT | C | D |
| EXAMPLE 6 OF CATALYST ARRANGEMENT | C | E |
| EXAMPLE 7 OF CATALYST ARRANGEMENT | B | D |
| EXAMPLE 8 OF CATALYST ARRANGEMENT | B | E |

According to the above catalyst layers, since the gas diffusion property and the ion conductivity are improved, the three-phase interfaces can be increased.

(Seventh Embodiment)

In the seventh embodiment, the catalyst layer 26 has three catalyst layers composed of the first layer 100, the second layer 110 and the third layer 112. The catalyst layer 30 has three layers composed of the first layer 120, the second layer 130 and the third layer 132. Each layer may be any combination of the aforementioned catalyst structures.

Typical catalyst arrangements having three catalyst layers are listed in Table 2.

TABLE 2

| | CATALYST STRUCTURE OF FIRST LAYER | CATALYST STRUCTURE OF SECOND LAYER | CATALYST STRUCTURE OF THIRD LAYER |
|---|---|---|---|
| EXAMPLE 9 OF CATALYST ARRANGEMENT | A | D | C |
| EXAMPLE 10 OF CATALYST ARRANGEMENT | A | D | B |
| EXAMPLE 11 OF CATALYST ARRANGEMENT | A | E | C |
| EXAMPLE 12 OF CATALYST ARRANGEMENT | A | E | B |
| EXAMPLE 13 OF CATALYST ARRANGEMENT | A | E | D |

(3) Catalyst structure C made by an ion exchanger made from a dendron, being adsorbed or bound to the platinum carried on carbon, as shown in the second embodiment.

(4) Catalyst structure D made by an ion exchanger made from a linear polymer being adsorbed or bound after mixing NAFION, as shown in the third embodiment.

(5) Catalyst structure E made by an ion-exchange made from a dendron, being adsorbed or bound after mixing NAFION, as shown in the fourth embodiment.

According to the above catalyst layers, the gas diffusion property and the ion conductivity can be improved while maintaining the three-phase interfaces.

COMPARATIVE EXAMPLE 1

In Example 1, a dendron ion exchanger (see Formula 2) was used when preparing a catalyst slurry for cathode. For comparison to Example 1, a cell was manufactured as Comparative Example 1, by using the catalyst slurry for cathode that uses a dendron compound (see Formula 1) in accordance with the following steps.

(Preparation of Catalyst Slurry)

5 g of the platinum black, which is used as a catalyst, was added into 10 g of water to be stirred. 0.5 g of the dendron compound (see Formula 1), which is described in the second embodiment, is added with 9.5 g of DMSO (dimethylsulfoxide) to be dissolved, resulting in a DMSO solution of the dendron compound. The above stirred catalyst was added with the DMSO solution of the dendron compound to produce a mixture. The mixture was then stirred sufficiently to produce a catalyst slurry. By using the catalyst slurry, a cell was manufactured in the same way as with Example 1.

(Evaluation of Power Generation Property)

Figure 12:
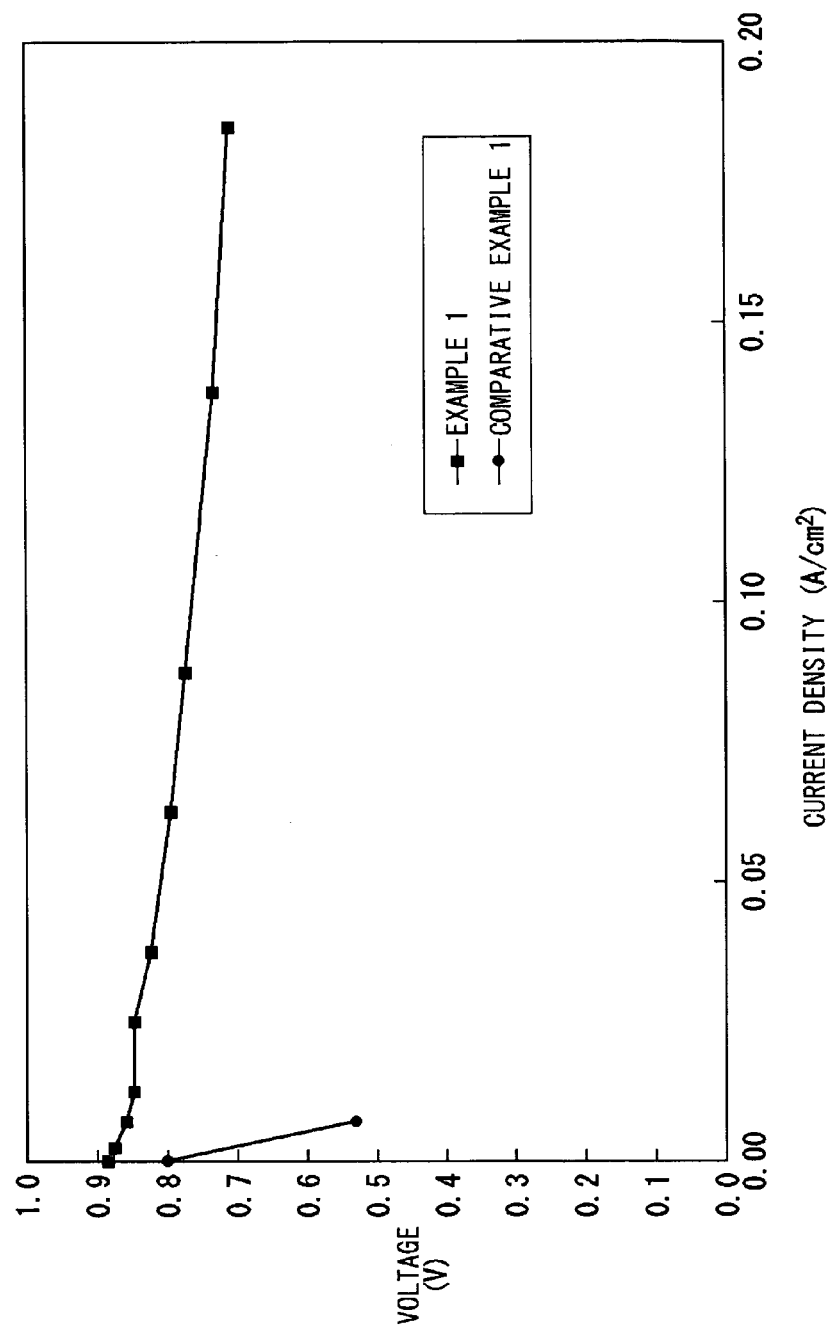
FIG. 12 is a graph showing results of evaluating the power generation properties of the cells of Example 1 and Comparative Example 1.

The cells of Example 1 and Comparative Example 1 were evaluated respectively for the power generation properties thereof. Power was generated under the conditions that: the temperature was 60° C.; the hydrogen flow rate was 200 ml/minute; and the air flow rate was 620 ml/minute. The results were shown in FIG. 12. As a result, it is found that the property could be improved by substituting a hydrogen atom for a sulfonic acid group. The reason is considered as follows:

In the case of a dendron compound that is not substituted by a sulfonic acid group, since the compound does not have any ion conductivity, a proton cannot move from the catalyst to the electrolyte. Therefore, a reaction occurring nearby the electrolyte only contributes to power generation, causing a difference in obtained current densities.

What is claimed is:

1. A fuel cell comprising:
   an electrolyte membrane;
   a cathode in contact with of one side of the electrolyte membrane; and
   an anode in contact with the other side of the electrolyte membrane, wherein the cathode and/or the anode comprises at least two catalyst layers,
   a first catalyst layer of said at least two catalyst layers comprises:
   a first catalytic metal; and
   a first ion exchanger which has a first functional group capable of being adsorbed or bound to the first catalytic metal, and a second functional group providing ion conductivity,
   wherein, the first functional group is adsorbed or bound to the first catalytic metal,
   a second catalyst layer of said at least two catalyst layers comprises:
   a second catalytic metal; and
   a second ion exchanger which has a functional group providing ion conductivity and has a structure different from that of the first ion exchanger,
   wherein, the first ion exchanger is a dendron polymer, and the first functional group capable of being adsorbed or bound to the first catalytic metal is located at a root of the dendron polymer.

2. The fuel cell according to claim 1, wherein a bond between the first functional group capable of being adsorbed or bound to the first catalytic metal and the first catalytic metal is a chemical bond or a bond by an electrostatic interaction.

3. The fuel cell according to claim 1, wherein the first functional group capable of being adsorbed or bound to the first catalytic metal is selected from a group consisting of functional groups including at least one of sulfur, oxygen, nitrogen, phosphorus, carbon, boron and a halogen atom.

4. The fuel cell according to claim 1, wherein the second functional group provided in the first ion exchanger and the second ion exchanger to provide ion conductivity is a sulfonic acid group, a phosphate group or a combination thereof.

5. The fuel cell according to claim 1, wherein
   the second catalyst layer is laminated closer to the electrolyte membrane than the first catalyst layer.

6. The fuel cell according to claim 1, wherein
   the second catalyst layer includes, in addition to the second ion exchanger, an ion exchanger having a first functional group capable of being adsorbed or bound to the second catalytic metal and a second functional group providing ion conductivity, and
   the second catalyst layer is laminated closer to the electrolyte membrane.

7. The fuel cell according to claim 1, further comprising a third catalyst layer,
   wherein the third catalyst layer comprises:
   a third catalytic metal; and
   an ion exchanger which has a functional group capable of being adsorbed or bound to the third catalytic metal and another functional group providing ion conductivity,
   wherein the first catalyst layer includes a dendron polymer ion exchanger as the first ion exchanger and also includes an ion exchanger having a functional group providing ion conductivity, and
   wherein the second catalyst layer, the first catalyst layer, and the third catalyst layer are laminated in the stated order from a side closer to the electrolyte membrane.

* * * * *